United States Patent [19]

Gomoll et al.

[11] Patent Number: 4,883,445

[45] Date of Patent: Nov. 28, 1989

[54] DEVICE FOR TENSIONING OF A PULLING ELEMENT OF A PRINTER

[75] Inventors: Günter Gomoll, Nersingen/Leibi; Wolfgang Hauslaib, Langenau, both of Fed. Rep. of Germany

[73] Assignee: Mannesmann Aktiengesellschaft, Düsseldorf, Fed. Rep. of Germany

[21] Appl. No.: 248,659

[22] Filed: Sep. 26, 1988

[30] Foreign Application Priority Data

Oct. 16, 1987 [EP] European Pat. Off. ...... 87 730 130.9

[51] Int. Cl.[4] .......................... B41J 19/20; F16H 7/14

[52] U.S. Cl. .................................... 474/113; 474/117; 400/320

[58] Field of Search ............... 474/113, 115, 117, 118, 474/133, 135, 136, 138; 400/320, 322, 335

[56] References Cited

U.S. PATENT DOCUMENTS

| | | | |
|---|---|---|---|
| 4,395,151 | 7/1983 | Krenz | 474/117 X |
| 4,484,485 | 11/1984 | Matsuhisa | 474/117 |
| 4,678,354 | 7/1987 | Olsen | 474/113 X |
| 4,761,154 | 8/1988 | Beauchamp et al. | 474/113 X |

FOREIGN PATENT DOCUMENTS

| | | | |
|---|---|---|---|
| 3319671 | 1/1987 | Fed. Rep. of Germany . | |
| 239268 | 11/1985 | Japan | 400/320 |
| 255881 | 11/1986 | Japan | 400/322 |

OTHER PUBLICATIONS

IBM Technical Disclosure Bulletin, "Proportional Spacing and Justification", Hickerson, vol. 8 No. 5, 10/1985.

*Primary Examiner*—Jerome W. Massie
*Assistant Examiner*—Matthew Smith
*Attorney, Agent, or Firm*—Horst M. Kasper

[57] ABSTRACT

A device is disclosed for tensioning of a pulling element (1) of a printer and in particular of a matrix printer, for a back and forth motion of a part (5) or of a carriage includes a first deflection roller (11) and a second deflection roller (12). A wedge surface (15) is furnished, which upon increasing inclination (16) is slidable in a direction parallel to a frame surface (17) disposed perpendicular to the pulling direction (18) and which wedge is subjected to the force of a tension spring (22) such that the adjustable second deflection roller (12) serves the purpose of an increase of the tensioning force in the pulling element (1). In order to provide a substantially rigid system, which also takes the production stretching of a pulling element (1)—pulling cord—into consideration, it is disclosed to rotatably support the second deflection roller (12) with its roller bearings (24) in a lever (13), formed as a covered casing (23) and that an adjustable cam (25) resting at the wedge surface (15) is rotatably supported in the casing (23) and that the cam position can be fixed.

17 Claims, 2 Drawing Sheets

DEVICE FOR TENSIONING OF A PULLING ELEMENT OF A PRINTER

BACKGROUND OF THE INVENTION

1. Field of the Invention

The invention relates to a device for tensioning of a pulling element in a printer, in particular in a matrix printer, which is attached to a device-part movable back and forth, which is guided over a first deflection roller driven and rotatably supported with a fixed rotation axis relative to the frame and which is guided via a second deflection roller; and which a pulling element is attached again with the other end to the back and forth moving device part, where the second deflection roller is rotatably supported at a tiltable lever, which in turn is supported around an axis in the printer frame running parallel to the second deflection roller and which the tiltable lever rests against a wedge surface; which wedge surface, with increasing inclination, is slidable parallel to a frame surface running vertical to the pulling direction and which wedge is under the pulling force of a tension spring, which tension spring acts in the sense of an increase of the pulling power.

2. Brief Description of the Background of the Invention Including Prior Art.

Such a pulling tension device is known from the German patent application DE-C2-33 19 671. The cord is tensioned upon acceleration in such device by pulling of the rope shaft. The component supporting the wedge surface yields in this case. In case of a braking, the component supporting the wedge surface slides back and is to damp back and forth vibrations based on these properties. However, such effects are only desired in case of daisy wheel printers, in order to be able to strike the same letter characters during forward and backward running of the printer carriage with exact positional covering, that means without staggering or shadow. Not all printer types require such a solution. The conventional solution therefore is only designed for daisy wheel printers.

A further principal problem in the case of cord tensioning devices comprises the fixing of the initial tension in order to maintain a predetermined minimum tension after termination of the setting process of the newly produced rope.

SUMMARY OF THE INVENTION

1. Purposes of the Invention

It is an object of the present invention to change the conventional device such that a base tension can be provided, which remains available after reaching of the setting tension in its defined value.

It is another object of the present invention to provide an improved adjustment mechanism for the tensioning of a cord in a printing device.

It is yet a further object of the present invention to provide an adjustment mechanism for a printing device tension, which is easily accessible for adjustment but at the same time protected against inadvertent change and which provides reliable operation and long term stability.

These and other objects and advantages of the present invention will become evident from the description which follows.

2. Brief Description of the Invention

The tensioning device for tensioning of a pulling element in a printer comprises a frame and an axis fixed relative to the frame. A carriage moves back and forth and has a first and a second end. A flexible line is attached to the first end of the carriage. A first deflection roller guides the flexible line coming from the carriage, where the first deflection roller is rotatably supported relative to the axis fixed relative to the frame. A second deflection roller has an axis and is guiding the flexible line coming from the first deflection roller. The second end of the flexible line is coming from the second deflection roller and is attached at the second end of the movable carriage. An axis is disposed in parallel to the axis of the second deflection roller. A frame surface is disposed perpendicular to the direction of the flexible line disposed between the first deflection roller and the second deflection roller. A wedge surface has a slope relative to the frame surface. The wedge surface can be shifted parallel to said frame surface disposed perpendicular to the direction of the flexible line. A tension spring is attached to the frame and to the wedge. The tension spring acts in the sense of an increase in tensioning force of the flexible line.

A tiltable lever forms a covering casing and rotatably supports the second deflection roller. The tiltable lever is supported at the axle disposed in parallel to the second axis of the second deflection roller. The tiltable lever rests against said wedge surface. The wedge surface is subjected to the force of the tension spring. The tension spring acts in the sense of an increase in tensioning force.

A support bearing supporting the second deflection roller can be mounted to the tiltable lever. An adjustable cam is settable to a fixed cam position and rotatably disposed in the tiltable lever formed as a covering casing. Said cam has a surface contacting the wedge surface. A locking catch toothing can be disposed at the circumference of the cam, and the tiltable lever arm has preferably an open space provided for the cam and a spacially relatively fixed catch finger for engaging into the toothing. The tiltable lever arm has an inner side. The locking catch finger is advantageously disposed at the inner side of the tiltable lever arm. The locking catch finger can be actuated from the outside through an additional opening in the tiltable lever arm. The printer can be a matrix printer. The wedge surface can be shifted with increasing wedge width relative to a contact point with the cam parallel to said frame surface disposed perpendicular to the direction of the flexible line in the pulling direction of said spring. The tiltable lever preferably comprises a hinge protrusion adapted to fit into a recess hole in the frame surface for fixing a position of the tiltable lever relative to the frame.

The tiltable lever cam comprise two support protrusions with a curved surface. The radii of curvature are disposed within planes spanned by the pulling direction and the direction of motion of the wedge. A bundle of tangents of the curved surface of one support protrusion substantially directed parallel to a line perpendicular to a plane spanned by the pulling direction and the direction of motion of the wedge substantially coincides with a bundle of equally directed tangents of the second support protrusion. The tiltable lever preferably comprises a hinge protrusion adapted to fit into a recess hole in the frame face for fixing a position of the tiltable lever relative to the frame. The distance, in projection, into a plane spanned by the pulling direction and the direction of wedge motion between the recess hole and the hinge protrusion is less than the diameter of the recess hole in a direction parallel to the direction of motion of the wedge.

The length of the wedge is preferably between 0.5 and one times the diameter of the second deflection roller. The slope angle of the wedge versus the frame surface can be from about 5 and 20 degrees.

The center of rotation of the cam relative to the contact point of the cam with the wedge is preferably disposed substantially parallel to a direction of increased thickness of the wedge. A locking catch toothing is disposed at the circumference of the cam opposite to the contact surface of the cam with the wedge. The tiltable lever arm can have an open space provided for the cam.

The locking means is preferably attached to the tiltable lever which stops the contact surface of the cam to move with the wedge surface in a tensioning direction of the spring. The wedge and a tilting axis of the tiltable lever are preferably disposed on opposite sides of the second deflection wheel or roller.

In particular according to the present invention, the second deflection roller with its roller bearings is rotatably supported within a lever formed as a covering casing, an adjustable cam is rotatably supported in the casing and rests at the wedge surface and the cam position can be fixed. After setting of a base tension, the preset minimum tension remains maintained via this lever, which is assured by the cam resting on the wedge surface. This, the present invention combines functionally the advantages of a cam with those of a wedge surface.

According to a feature of the invention, a recess or an opening is provided in the casing for the cam and that a locking toothing is disposed at the circumference of the cam into which a locking toothing and a locking catch finger, relatively spatially fixed, engages the locking toothing. The setting of the base tension therefore is particularly easy to perform and the number of the required device parts is very small in order to achieve the desired effect.

Another improvement of the invention comprises that the locking finger is disposed at the inner side of the casing and can be actuated from the outside through an additional opening in the casing. Based on this construction, the position of the cam can be recognized from the outside and thus the base tension position can be visually inspected.

An embodiment of the invention is illustrated in the drawing.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention.

DESCRIPTION OF INVENTION AND PREFERRED EMBODIMENT

Figure 1:
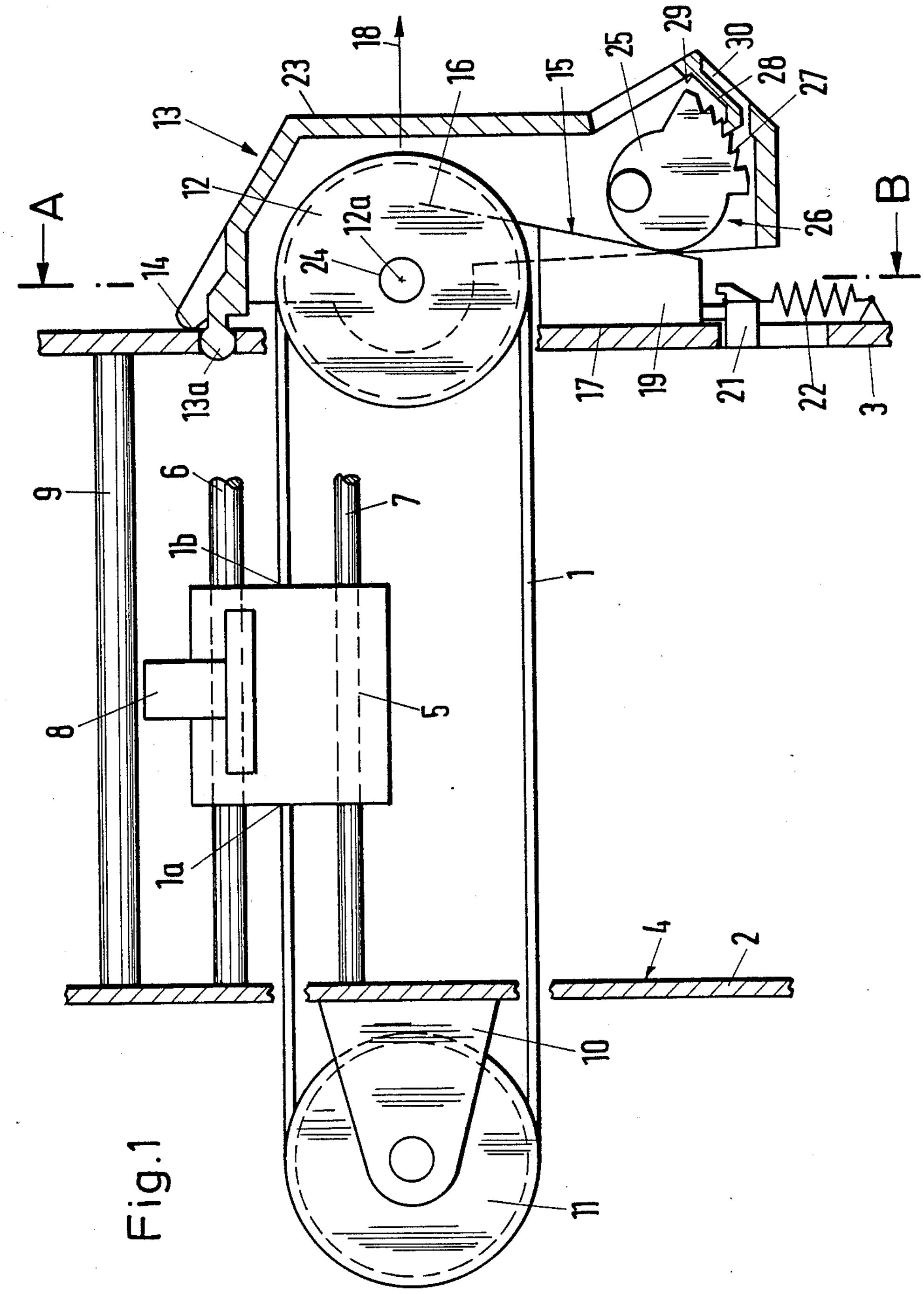
FIG. 1 is a plan view unto a device for tensioning of a pulling element of a matrix printer component group.

In accordance with the present invention, there is provided a device for tensioning a pulling element 1 in a printer, in particular a matrix printer, which pulling element is attached with one end **1*a* to a component part 5 movable back and forth, which device is guided via a first deflection roller 11 rotatably supported relative to an axis fixed relative to a frame and which is guided over a second deflection roller 12 and with the other end 1*b*** again attached at the part movable back and forth.

The second deflection roller 12 is rotatably supported at a tiltable lever 13. The tiltable lever 13 is supported at an axis 14 disposed in parallel to the second deflection roller axis **12*a* and rests against a wedge surface 15. The wedge surface can be shifted with increasing inclination 16 parallel to a frame surface disposed perpendicular to the pulling direction 18. The wedge surface is subjected to the force of a tension spring 22 and acts in the sense of an increase in tensioning force. The second deflection roller 12 with its support bearings 24 is rotatably supported in a lever formed as a covering casing 23. An adjustable cam 25 is rotatably disposed in the case 23 adjoining the wedge surface 15**. The cam position can be fixed.

The casing 23 can have an open space 26 versus the cam 25. A locking catch toothing 27 is disposed at the circumference of the cam 25 and a relatively spatially fixed catch finger engages into the toothing 27. The locking catch finger 28 can be disposed at the inner side 29 of the casing 23 and can be actuated from the outside through an additional opening 30 in the casing 23.

The device for tensioning of a pulling element 1 is disposed according to FIG. 1 in the region of the side platens 2 and 3, which form a printer frame 4. The back and forth movable component part 5 is guided between these two side platens 2 and 3. The component part 5 comprises in this case a print head carriage, which is guided on guide rails 6 or, respectively, 7. The component part 5 carries a print head 8, which generates letter characters on a recording medium and the component part 5 itself is transported over a print support 9.

A first deflection roller 11 rotatably supported in a support bearing 10 in a pedestal bearing or pillow block is fixedly placed at the printer frame 4 on the left side of platen 2. A second deflection roller 12, which is adjustably disposed, is placed at the right side of platen 3.

The pulling element 1, which comprises a cord, a tooth belt or the like, is attached with one end **1*a* at the back and forth moving component part 5, is guided, via the first deflection roller 11 and via the second deflection roller 12, and is attached with the other end 1*b* again at the back and forth moving component part 5**.

Figure 3:
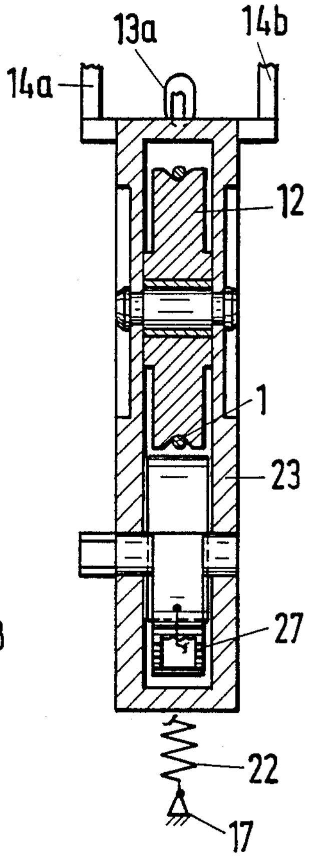
FIG. 3 is a section along section line A-B of FIG. 1.

The second deflection roller 12 is rotatably supported for technically functioning at a lever 13. The lever 13 is supported on a pair of support protrusions **14*a* and 14*b* at the side platen 3, where a hinge protrusion 13*a*, illustrated in FIG. 3 is provided between the support protrusions 14*a*, 14*b*. The second deflection roller 12 runs with its deflection roller axis 12*a* parallel to a rotation axis 14, which is formed in the printer frame 4. The lever 13 rests immediately against the wedge surface 15. The inclination 16 of the wedge surface 15 slopes such, that the lever 13 relative to the frame face 17 is tilted from the printer frame 4 around the rotation axis 14, that is, the second deflection roller 12 is moved in pulling direction 18. A wedge body 19 exhibiting the wedge surface 15 or, respectively, the inclination 16 is moved in a guide constraint 20 with a guide protrusion 21, where this motion is based on a tension spring 22 attached at the printer frame 4. The force of the pulling spring 22 supports in this situation an adjustment of the second deflection roller 12 in a direction parallel or perpendicular to the frame face 17. Thus, the tension force in pulling direction 18 increases with the inclined face 16**.

Now the lever 13 is provided as a covering casing 23, where the second deflection roller 12 is disposed with its roller bearings 24 in a covering casing 23 and all motions of the casing 23 or, respectively, of the lever 13 are performed simultaneously. The covering casing 23 in addition accepts an adjustable cam 25, where the position of the cam can be fixed.

A recess hole space 26 is provided in the casing 23 opposite to the cam 25 through which the cam 23 passes through with its cam circumference 23*a* and rests on the wedge surface 15. The cam circumference 23*a* exhibits in a section a locking toothing 27, where a catch finger 28 is spatially fixed relative to the lever 13 and engages the locking toothing 27. The catch finger 28 is disposed at the inner side 29 and is actuatable from the outside through a further opening 30 in the casing 23.

Figure 2:
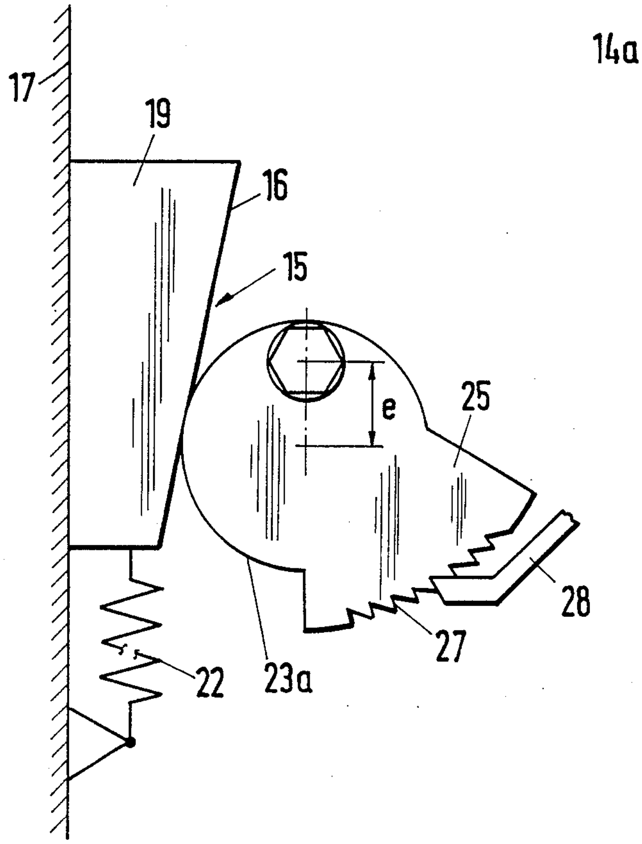
FIG. 2 is a partial section at an enlarged scale of FIG. 1.

The cam 25, illustrated in FIG. 2 exhibits an eccentricity "e". As soon as the pulling elements 1, illustrated in FIG. 3, is placed in position, the basic tension, which is a minimum tension in the pulling element 1, is set via this eccentricity "e". In this case, a cord friction value determined by experience is used as a setting base in a conventional manner. It is to be observed at this point, that the base tension is set as low as possible, in order to maintain the bearing forces of the first deflection roller 11 and of the second deflection roller 12 as small as possible, which means a small required drive power. Frequently drive forces are branched off from the drive of the deflection rollers 11 and 12 such that the drive power has to be increased. In addition, different friction situations can occur within the length of one line. As mentioned initially, this consideration is against the conventional spring supported deflection roller. A spring supported deflection roller entails varying pulling element forces and creates irregular motions in the pulling force direction 18, whereby nonuniform positioning of the back and forth moving component part 5 can be effected.

The tension spring 22 does not operate in the above described way in the case of the embodiment of the prevent invention. Consideration of FIG. 2 illustrates that in case of a very large spring constant of the system tending toward infinity, the change of the deflection roller 12 becomes nearly zero.

On the other hand, the setting of a base tension in the tensioned pulling element 1 is important. It is to be considered, that in each case steel ropes made from strand cords can exhibit two different stretching states. On the one hand a stretching in the relatively thin individual cord lines themselves and on the other hand in the braiding of the cord during production. This production stretching occurs in practical situations as a creeping process, that is, the rope tension continuously decreases within certain limits. For this reason a base tension in the shape of a minimum tension is required. In fact, it would be possible to increase the base tension in order to maintain upon termination of the setting process required a minimum tension. However, a final tension too high results in an increase of the driving power required and under certain circumstances results in lifetime problems of the pulling element because of overloading. The invention takes into consideration these aspects by furnishing, via the cam 25, a rigid support of the pulling element system with an automatically adjusting device. For this purpose, the automatically adjusting device serves only for the balancing of the so-called production stretching in the tensioned pulling element 1.

It will be understood that each of the elements described above, or two or more together, may also find a useful application in other types of office equipment system configurations and positioning procedures differing from the types described above.

While the invention has been illustrated and described as embodied in the context of a device for tensioning a pulling element of a printer it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic of specific aspects of this invention.

What is claimed as new and desired to be protected by Letters Patent is set forth in the appended claims.

We claim:

1. A tensioning device for tensioning of a pulling element in a printer comprising a frame;

an axis fixed relative to the frame;

a carriage movable back and forth and having a first and a second end;

a flexible line attached to the first end of the carriage;

a first deflection roller guiding the flexible line coming from the carriage, where the first deflection roller is rotatably supported relative to the axis fixed relative to the frame;

a second deflection roller having a second axis and guiding the flexible line coming from the first deflection roller and where the second end of the flexible line coming from the second deflection roller is attached at the second end of the movable carriage;

an axle disposed in parallel to the second axis of the second deflection roller;

a frame surface disposed perpendicular to the direction of the flexible line disposed between the first deflection roller and the second deflection roller;

a wedge face having a slope relative to the frame surface and which wedge face can be shifted parallel to said frame surface disposed perpendicular to the direction of the flexible line;

a tension spring attached to the frame and to the wedge, which tension spring acts in the sense of an increase in tensioning force of the flexible line;

a tiltable lever formed as a covering casing and rotatably supporting the second deflection roller, which tiltable lever is supported at the axle disposed in parallel to the second axis of the second deflection roller and where the tiltable lever rests against said wedge face and which wedge face is subjected to the force of the tension spring, which tension spring acts in the sense of an increase in tensioning force;

support bearings supporting the second deflection roller and mounted to the tiltable lever;

an adjustable cam settable to a fixed cam position and rotatably disposed in the tiltable lever formed as a covering casing and said cam having a surface contacting the wedge surface.

2. The device for tensioning of a pulling element in a printer according to claim 1 further comprising a locking catch toothing disposed at the circumference of the cam, wherein the tiltable lever arm has an open space provided for the cam; and a spacially relatively fixed catch finger for engaging into the toothing.

3. The device for tensioning of a pulling element in a printer according to claim 2 wherein the tiltable lever arm has an inner side;

wherein the locking catch finger is disposed at the inner side of the tiltable lever arm; and wherein the locking catch finger can be actuated from the outside through an additional opening in the tiltable lever arm.

4. The device for tensioning of a pulling element in a printer according to claim 1 wherein the printer is a matrix printer.

5. The device for tensioning of a pulling element in a printer according to claim 1 wherein the wedge face can be shifted with increasing wedge width relative to a contact point with the cam parallel to said frame surface disposed perpendicular to the direction of the flexible line in the pulling direction of said spring.

6. The device for tensioning of a pulling element in a printer according to claim 1 wherein the tiltable lever comprises a hinge protrusion adapted to fit into a recess hole in the frame face for fixing a position of the tiltable lever relative to the frame.

7. The device for tensioning of a pulling element in a printer according to claim 1 wherein the tiltable lever comprises two support protrusions with a curved surface where the radii of curvature are disposed within planes spanned by the pulling direction and to the direction of motion of the wedge and where a bundle of tangents of the curved surface of one support protrusion substantially directed parallel to a line perpendicular to a plane spanned by the pulling direction and the direction of motion of the wedge substantially coincides with a bundle of equally directed tangents of the second support protrusion.

8. The device for tensioning of a pulling element in a printer according to claim 7 wherein the tiltable lever comprises a hinge protrusion adapted to fit into a recess hole in the frame face for fixing a position of the tiltable lever relative to the frame and where the distance in projection into a plane spanned by the pulling direction and the direction of wedge motion between the recess hole and the hinge protrusion is less than the diameter of the recess hole in a direction parallel to the direction of motion of the wedge.

9. The device for tensioning of a pulling element in a printer according to claim 7 wherein the length of the wedge is between 0.5 and one times the diameter of the second deflection roller.

10. The device for tensioning of a pulling element in a printer according to claim 7 wherein the slope angle of the wedge versus the frame surface is from about 5 to 20 degrees.

11. The device for tensioning of a pulling element in a printer according to claim 1 wherein the center of rotation of the cam relative to the contact point of the cam with the wedge is disposed substantially parallel to a direction of increased thickness of the wedge.

12. The device for tensioning of a pulling element in a printer according to claim 1 further comprising a locking catch toothing disposed at the circumference of the cam opposite to the contact surface of the cam with the wedge, wherein the tiltable lever arm has an open space provided for the cam.

13. The device for tensioning of a pulling element in a printer according to claim 12 further comprising locking means attached to the tiltable lever which stops the contact surface of the cam to move with the wedge surface in a tensioning direction of the spring.

14. The device for tensioning of a pulling element in a printer according to claim 1 wherein the wedge and an axis of tilting of the tiltable lever are disposed on opposite sides of the second deflection roller.

15. A device for tensioning of a pulling element (1) in a printer, in particular a matrix printer, attached with one end (1*a*) to a part (5) movable back and forth, said device is guided via a first deflection roller (11) rotatably supported relative to an axis fixed relative to a frame and which is guided over a second deflection roller (12) and with the other end (1*b*) again attached at the part movable back and forth, said second deflection roller (12) is rotatably supported at a tiltable lever (13), said tiltable lever (13) is supported at an axle (14) disposed in parallel to the second deflection roller axle (12*a*) and rests against a wedge face (15), said wedge face can be shifted with increasing slope (16) parallel to a frame surface disposed perpendicular to the pulling direction (18) and said wedge face is subjected to the force of a tension spring (22), acting in the sense of an increase in tensioning force, wherein the second deflection roller (12) with support bearings (24) is rotatably supported in a lever formed as a covering casing (23), and an adjustable cam (25) is rotatably disposed in the case (23) adjoining the wedge surface (15) and wherein the cam position can be fixed.

16. The device for tensioning of a pulling element in a printer according to claim 15 wherein the casing (23) has an open space (26) versus the cam (25) and where a locking catch toothing (27) is disposed at the circumference of the cam (25) and a spacially relatively fixed catch finger engages into the toothing (27).

17. The device for tensioning of a pulling element in a printer according to claim 16 wherein the locking catch finger (28) is disposed at the inner side (29) of the casing (23) and can be actuated from the outside through an additional opening (30) in the casing (23).

* * * * *